(12) United States Patent
Sickels

(10) Patent No.: US 6,467,745 B1
(45) Date of Patent: Oct. 22, 2002

(54) MOUNTING BRACKET ASSEMBLY

(75) Inventor: Michael S. Sickels, Kettering, OH (US)

(73) Assignee: Soundfold, Inc., Centerville, OH (US)

(*) Notice: Subject to any disclaimer, the term of this patent is extended or adjusted under 35 U.S.C. 154(b) by 44 days.

(21) Appl. No.: 09/761,052

(22) Filed: Jan. 16, 2001

(51) Int. Cl.[7] ............................. E06B 7/28; E04G 3/00
(52) U.S. Cl. .................... 248/242; 248/241; 248/297.2; 248/235
(58) Field of Search ................ 248/235, 241, 248/242, 250, 297.21

(56) References Cited

U.S. PATENT DOCUMENTS

| | | | |
|---|---|---|---|
| 946,337 A | * | 1/1910 | Clear ........................ 312/136 |
| 3,561,713 A | * | 2/1971 | Berkowitz ................. 248/242 |
| 3,858,836 A | | 1/1975 | Marcyan |
| 3,908,942 A | | 9/1975 | Keith et al. |
| 4,151,971 A | | 5/1979 | Daly et al. |
| 4,183,489 A | | 1/1980 | Copher et al. |
| 4,325,529 A | | 4/1982 | Seebinger |
| 4,693,380 A | * | 9/1987 | Muth ........................ 211/35 |
| D295,415 S | | 4/1988 | Thies et al. |
| 4,928,914 A | | 5/1990 | Snodell |
| 4,984,760 A | | 1/1991 | Cohn et al. |
| 5,016,850 A | | 5/1991 | Plahn |
| D325,868 S | | 5/1992 | Bartok |
| 5,201,896 A | | 4/1993 | Kruszewski |
| 5,452,875 A | * | 9/1995 | Kern ......................... 248/242 |
| 5,455,975 A | | 10/1995 | Foster |
| 5,460,345 A | * | 10/1995 | Trevaskis ............... 248/225.21 |
| D383,621 S | | 9/1997 | Corpuz, Jr. |
| 5,664,752 A | | 9/1997 | Matthiessen et al. |
| 5,704,578 A | | 1/1998 | Fischer |
| 5,730,409 A | | 3/1998 | Baron et al. |
| 5,738,320 A | | 4/1998 | Matos et al. |
| 5,842,672 A | | 12/1998 | Sweere et al. |
| 6,234,328 B1 | * | 5/2001 | Mason .................... 211/90.02 |

* cited by examiner

Primary Examiner—Ramon O. Ramirez
Assistant Examiner—Amy J. Sterling
(74) Attorney, Agent, or Firm—Biebel & French

(57) ABSTRACT

A mounting bracket assembly for adjustably mounting an object to a support surface. The bracket assembly includes a first mounting member removably attached to a support surface. A locking device is supported by the first mounting member and defines a plurality of locked positions spaced apart along an arcuate path. A first arm is secured to the first mounting member and supports a second arm which is movable substantially along the arcuate path for releasable engagement with the locking device at a selected one of the locked positions. A pivot connector interconnects the first arm and the second arm and facilitates selected angular positioning of the second arm relative to the first mounting member.

14 Claims, 8 Drawing Sheets

FIG·6

MOUNTING BRACKET ASSEMBLY

BACKGROUND OF THE INVENTION

1. Field of the Invention

The present invention relates generally to mounting bracket assemblies and, more particularly, to a mounting bracket assembly for securing a speaker or appliance to a wall or ceiling.

2. Description of the Prior Art

Mounting bracket assemblies for adjustably supporting objects on walls, ceilings, shelves, floors and other support surfaces are generally well known in the art. Prior art mounting bracket assemblies have typically been designed with one or more pivotal links to enable the bracket assembly to be rearranged and thereby locate the attached object in any one of a number of desired positions. Such bracket assemblies enable an object to be supported in its intended or desired position despite the orientation of the adjacent support surface to which it is mounted.

Conventional mounting bracket assemblies have been used in particular with audio speakers to mount the speakers on a wall or a ceiling of a room. Such speaker bracket assemblies have found increased use in business establishments, such as restaurants, theaters, etc., where the broadcast audio sounds must fill large areas. These speaker bracket assemblies have also been used in residential houses where surround sound is desired.

It is well known to utilize a ball and socket mounting bracket assembly for supporting an audio speaker in order to provide the ability to orient the speaker relative to the audience. However, such traditional ball and socket mounting bracket assemblies are often expensive and difficult to install. For example, a common type of ball and socket audio speaker mounting bracket assembly includes a device forming a socket which is mounted to the speaker. A threaded bolt extends through the arms of the device to enable a ball to be inserted into the device before the bolt is tightened to secure the attached speaker in place. As may be appreciated, these types of ball and socket bracket assemblies are often difficult to install such that installation of a speaker to a wall or ceiling often requires at least two installers.

Accordingly, there is a need in the art for an inexpensive mounting bracket assembly of a simple design which is easy to install while providing the necessary strength for supporting a speaker in an adjustable manner.

SUMMARY OF THE INVENTION

The present invention is a mounting bracket assembly for adjustably mounting an object, such as an audio speaker, to a support surface.

The mounting bracket assembly of the present invention includes a first mounting member removably attachable to a support surface, such as a vertically oriented wall or horizontally oriented ceiling. A locking device is supported by the first mounting member and includes an arcuate strip. The arcuate strip includes a concave surface facing outwardly away from the first mounting member and toward a second mounting member. The second mounting member is releasably attachable to an object for adjustably supporting the object from the support surface.

A plurality of apertures defining a plurality of locked positions are formed within the arcuate strip and are spaced apart along an arcuate path. The apertures preferably comprise a plurality of elongated slots defined by a pair of longitudinally extending side walls and a pair of laterally extending end walls.

A first arm includes a first end rigidly fixed to the first mounting member below the arcuate strip and a second end positioned in spaced relation to the first mounting member. The first arm preferably comprises a U-shaped channel including a pair of spaced apart upwardly extending side walls connected to a substantially horizontally extending base.

A second arm is removably receivable within the side walls of the first arm and includes a locking tab supported proximate a first end. The first end of the second arm is movable substantially along the arcuate path defined by the plurality of apertures wherein the locking tab is selectively receivable within a selected one of the apertures for releasably locking the second arm relative to the first mounting member.

A pivot connector provides for pivoting movement of the second arm relative to the first arm along the arcuate path, and thereby facilitates angular positioning of the second arm relative to the first mounting member. The pivot connector includes a connector tab extending upwardly from proximate the second end of the first arm and an aperture formed proximate the second end of the second arm, wherein the aperture releasably receives the connector tab.

In operation, the second arm may be pivoted about the pivot connector into various angular positions by removing the locking tab from the selected aperture in the arcuate strip of the locking device. Once the desired angular position is selected, the locking tab is then inserted into the corresponding aperture for locking the second arm in position relative to the first arm. As such, the second mounting member is positioned in a desired angular orientation relative to the first mounting member.

During the installation process, the speaker is initially directly mounted to the second mounting member through conventional fasteners. The first mounting member is independently secured to the support surface through conventional fasteners. The speaker and second mounting member, in combination with the second arm, are next positioned on the first arm with the connector tab pivotally received within the aperture of the second arm. Next, the locking tab is received within the appropriate aperture of the locking device, thereby securing the second arm, and speaker, in place.

Therefore, it is an object of the present invention to provide a simple and inexpensive mounting bracket assembly for attaching an object to a support surface.

It is a further object of the present invention to provide such a mounting bracket assembly including interchangeable parts for facilitating simple and efficient replacement of the supported object.

It is another object of the present invention to provide a mounting bracket assembly for facilitating the tilting adjustment of the supported object.

It is a further object of the present invention to provide a mounting bracket assembly which is easy to assemble, install and use.

Other objects and advantages of the invention will be apparent from the following description, the accompanying drawings and the appended claims.

DETAILED DESCRIPTION OF THE PREFERRED EMBODIMENT

The present invention is a mounting bracket assembly 10 for mounting an object to a support surface wherein the object may be repositioned in a vertical plane as needed for a particular application. Although the mounting bracket assembly 10 described hereinafter is defined and illustrated as mounting an audio speaker to a support surface, it should be understood that the bracket assembly 10 may be employed for mounting other objects in a number of different applications.

Figure 1:
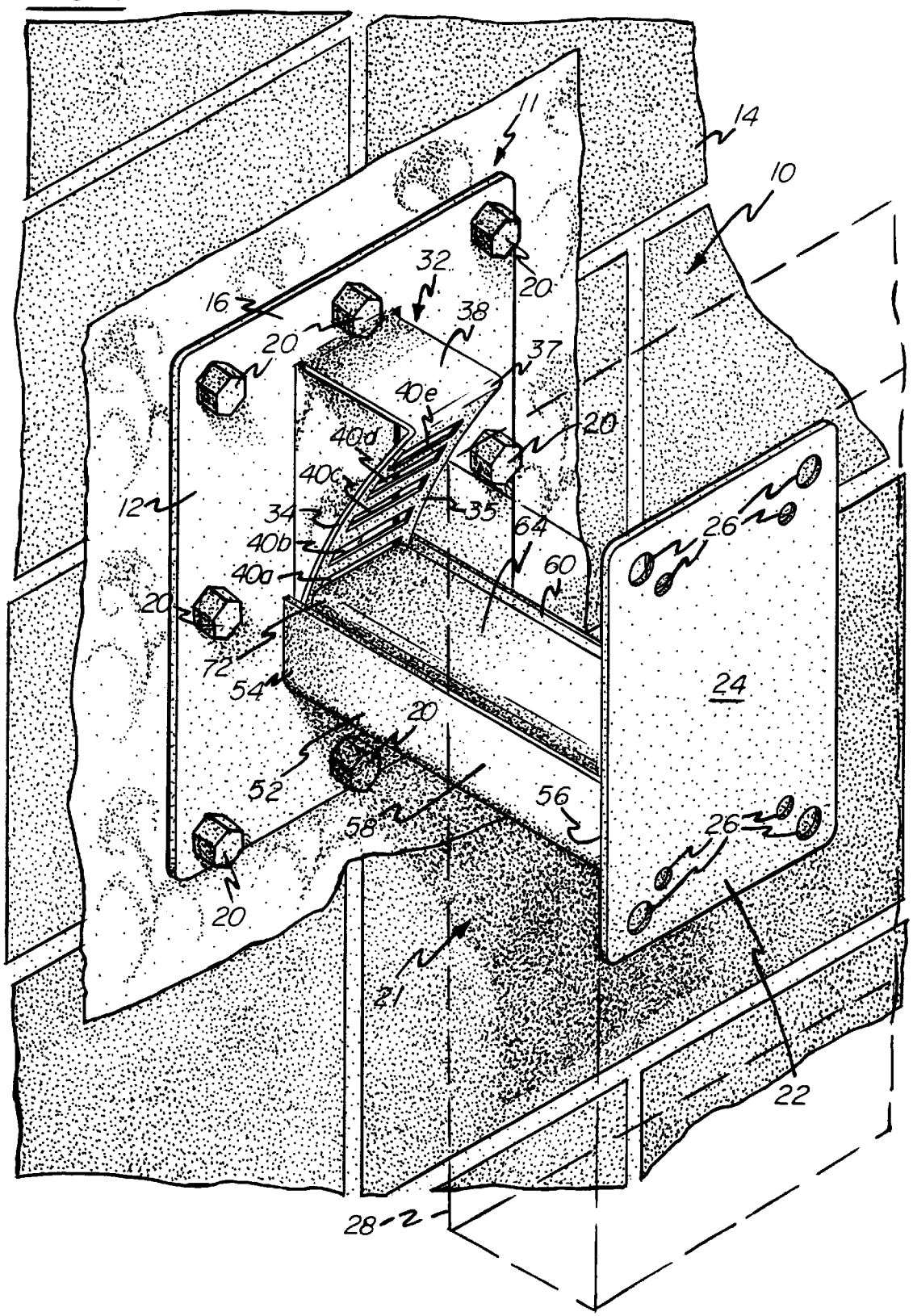
FIG. 1 is a perspective view of the mounting bracket assembly of the present invention as secured to a vertically oriented wall.
Figure 2:
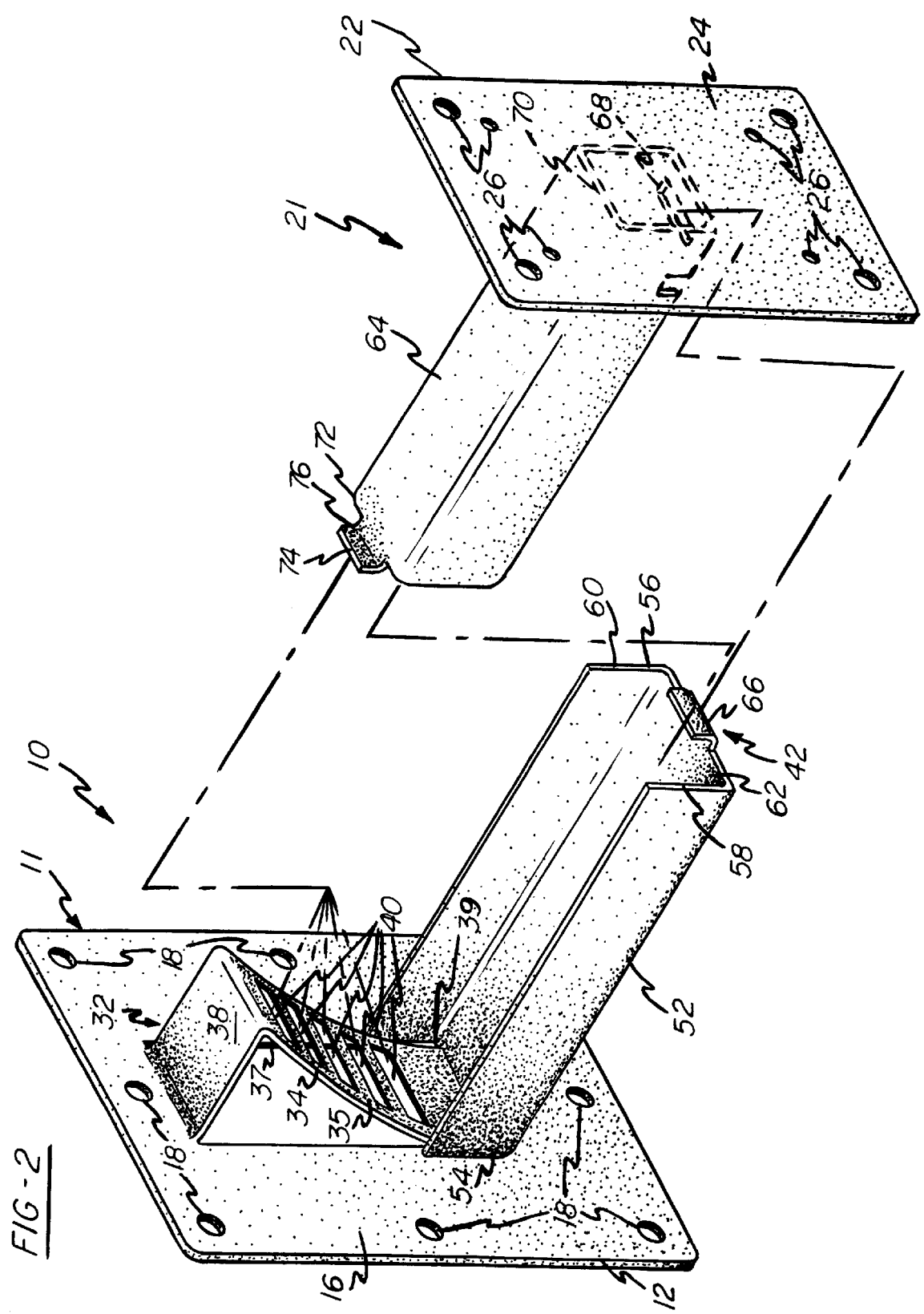
FIG. 2 is a partially exploded perspective view of the mounting bracket assembly of FIG. 1.
Figure 3:
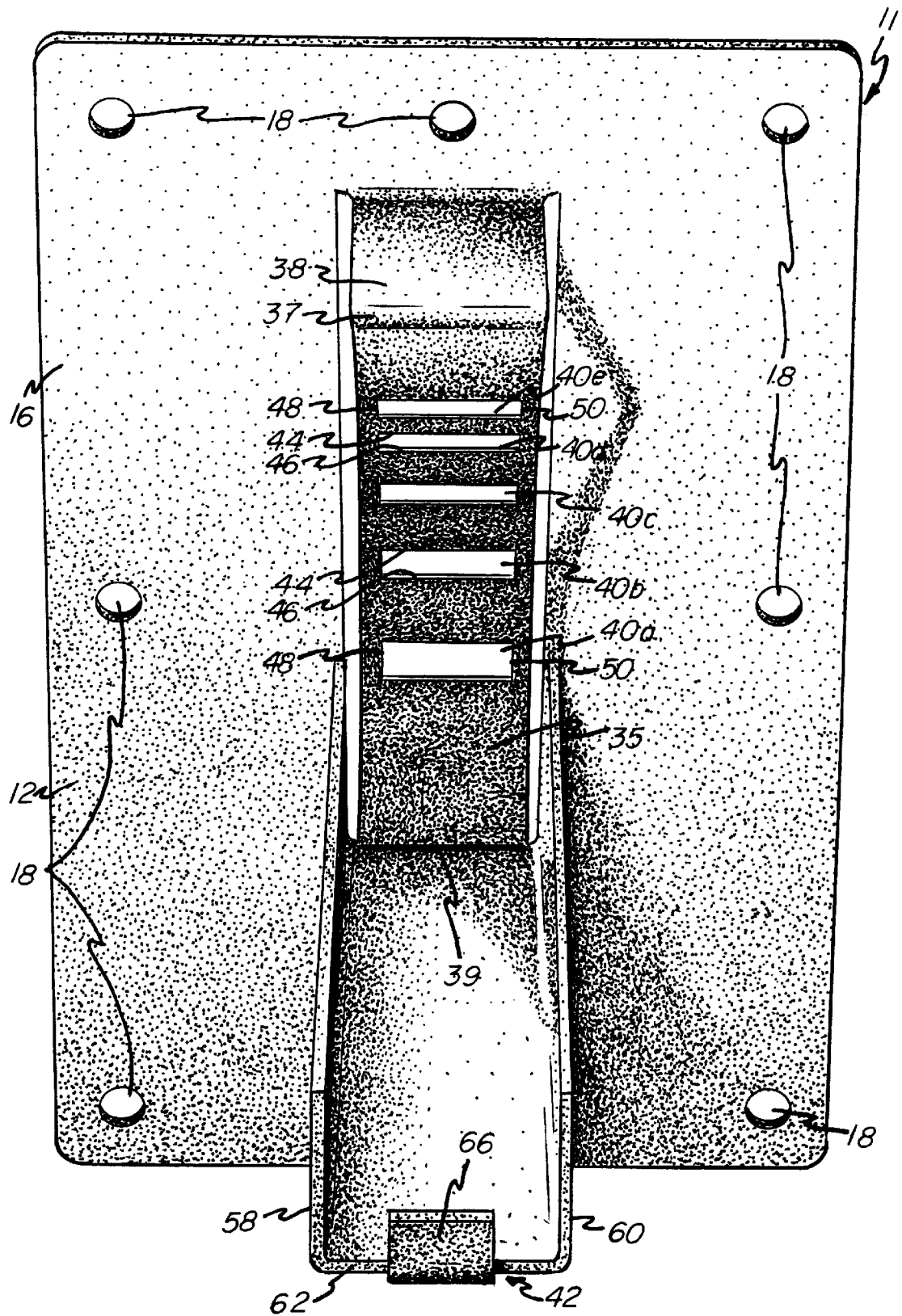
FIG. 3 is a perspective view of the base of the mounting bracket assembly of the present invention as viewed from the front and top.

Referring initially to FIGS. 1–3 of the drawings, the mounting bracket assembly 10 of the present invention comprises a base 11 including a first mounting member 12 which is removably attachable to a support surface, such as a vertically aligned wall 14. The first mounting member 12 preferably comprises a substantially planar first mounting plate 16 including a plurality of through mounting apertures 18 formed therein. Conventional fasteners, preferably bolts 20, are utilized to secure the first mounting plate 16 to the wall 14. While the first mounting plate 16 is illustrated as having a substantially rectangular shape, it should be appreciated that the plate 16 may be formed with a square, circular, polygonal or other cross-sectional shape. Furthermore, the first mounting plate 16 may also be mounted to a shelf, ceiling, floor or other suitable support surface. The support surface to which the first mounting plate 16 is attached may have any orientation, such as horizontal, vertical or angular.

Figure 4:
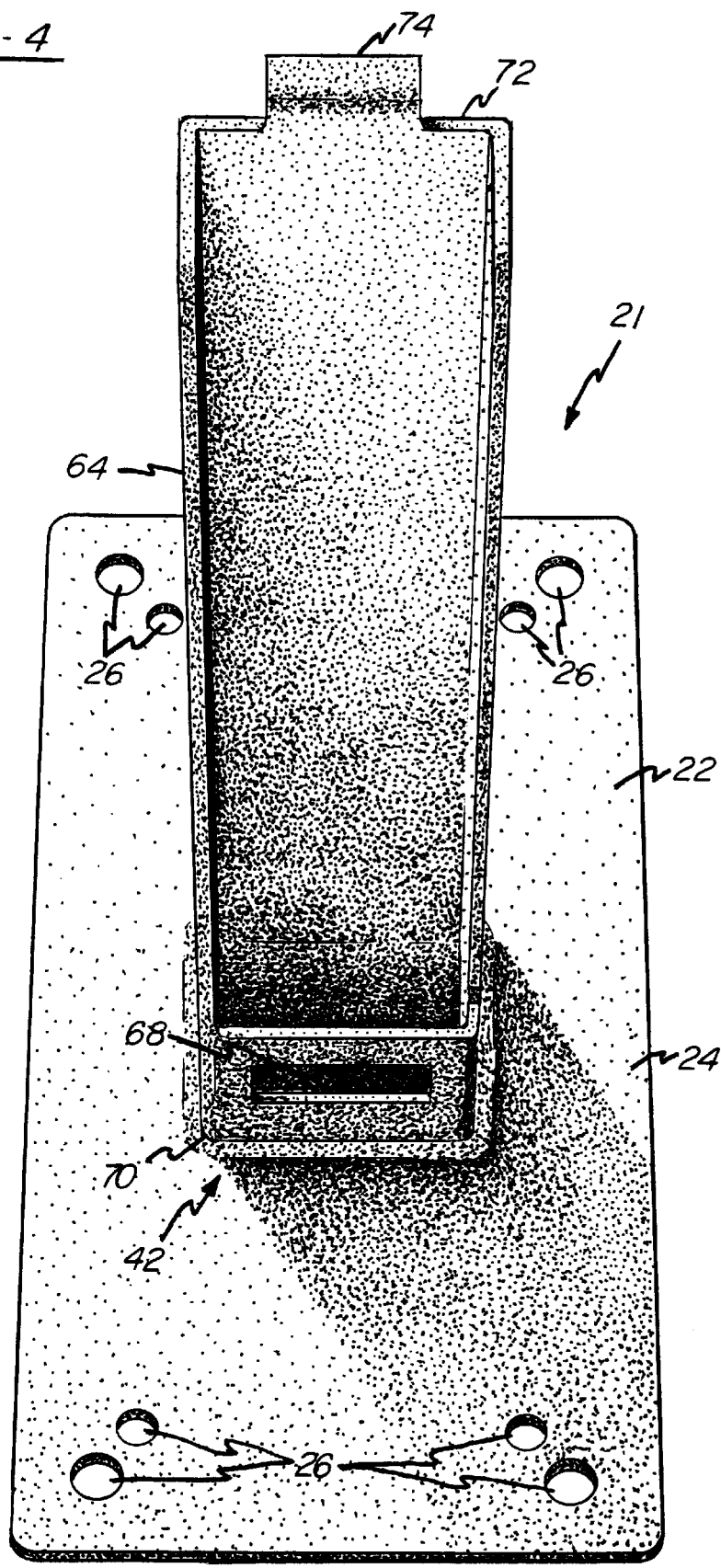
FIG. 4 is a perspective view of the hanger of the mounting bracket assembly of the present invention as viewed from the rear and bottom.

Referring now to FIGS. 1, 2 and 4, a hanger 21 is supported for adjustable movement in a substantially vertical plane relative to the base 11 and includes a second mounting member 22 supported in spaced relation to the first mounting member 12. The second mounting member 22 preferably comprises a substantially planar second mounting plate 24, including a plurality of mounting apertures 26 formed therethrough. A conventional audio speaker 28 (FIG. 1) may be attached to the mounting plate 24 through fasteners (not shown) passing through the mounting apertures 26 in a manner well known in the art.

A locking device 32 is supported by the first mounting plate 16 and preferably comprises an arcuate strip 34 having a concave surface 35 facing the second mounting member 22 and a convex surface 36 facing the first mounting member 12. A first end 37 of the arcuate strip 34 is connected to the first mounting plate 16 through a horizontally extending support strip 38 disposed perpendicularly to the plate 16. A second end 39 of the arcuate strip 34 is directly attached to the mounting plate 16 below the first end 37.

With further reference to FIGS. 1, 3 and 5–7, a plurality of apertures 40a, 40b, 40c, 40d and 40e are formed within the arcuate strip 34 and are equally circumferentially spaced relative to each other along an arcuate path. More particularly, each aperture 40 is offset from an adjacent aperture 40 by an angle α, which preferably equals approximately 7½ degrees, such that aperture 40e is offset from aperture 40a by approximately 30 degrees. The apertures 40a, 40b, 40c, 40d and 40e are all substantially equally spaced in a radial direction from a pivot connector 42.

Each aperture 40 is defined by longitudinally extending side walls 44 and 46 and laterally extending end walls 48 and 50 (FIG. 3). The apertures 40 define a plurality of locked positions spaced apart along the arcuate path. While the locking device 32 herein described and illustrated includes five successive apertures 40a, 40b, 40c, 40d and 40e equally offset by an angle of approximately 7½ degrees, it should be appreciated that the particular member of apertures 40 and the spacing therebetween may be varied without departing from the scope of the invention.

With further reference to FIGS. 2–7, a first or fixed arm 52 is rigidly secured to the first mounting plate 16 at a first end 54. A second end 56 of the first arm 52 is positioned in spaced relation to the first end 54 and extends outwardly from the mounting plate 16. The first arm 52 is preferably formed of a U-shaped channel including first and second side walls 58 and 60 extending upwardly from a base 62.

Figure 8:
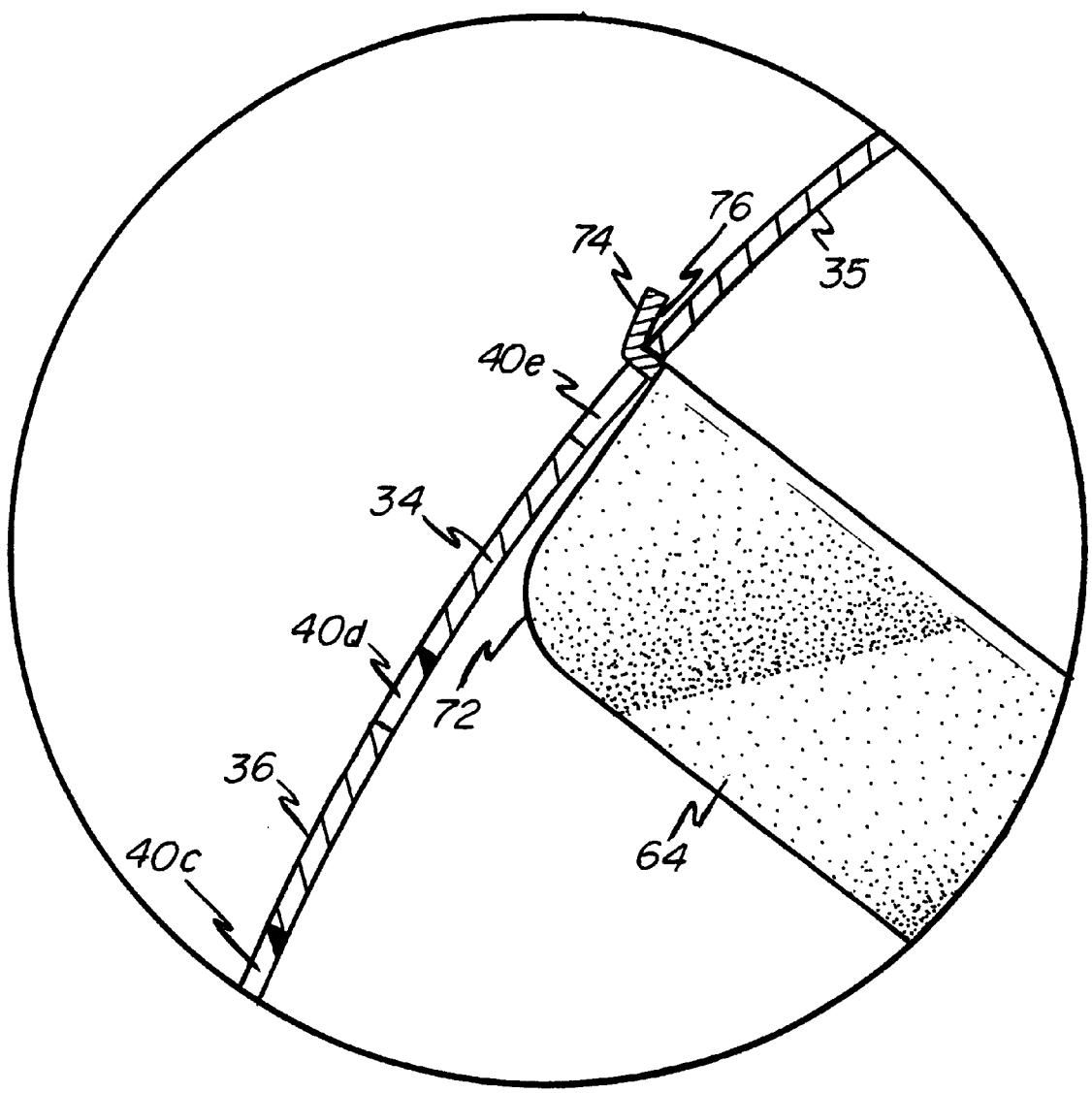
FIG. 8 is a detailed section view of FIG. 7.

A second or movable arm 64 is pivotally connected to the first arm 52 at the pivot connector 42. More particularly, an upwardly extending pivot tab 66 is supported proximate the second end 56 of the first arm 52 and is releasably and pivotally received within an aperture 68 formed proximate a second end 70 of the second arm 64. The first end 72 of the second arm 54 supports a locking tab 74 which is releasably received within a selected one of the apertures 40a, 40b, 40c, 40d and 40e. The locking tab 74 includes an outwardly facing surface 76 for releasable engagement with a selected one of the side walls 44 of the apertures 40 (FIGS. 2, 3 and 8).

The second arm 64 preferably comprises a tubular member receivable intermediate the side walls 58 and 60 of the first arm 52. Such a nesting arrangement of the first and second arms 52 and 64 provides for compactness of the mounting bracket assembly 10.

During installation of the mounting bracket assembly 10, the base 11 is secured to a wall 14 by fasteners 20 passing through mounting apertures 18 of the first mounting plate 16. The speaker 28, or other object, is independently and separately secured to the second mounting plate 24 through fasteners in a conventional manner to form the hanger 21. Once the speaker 28 is so secured, the hanger 21 is then releasably secured to the base 11 by positioning the locking tab 74 within one of the desired apertures 40 and placing the aperture 68 of the second arm 64 about the pivot tab 66. The angle of inclination of the speaker 28 may be readily changed by merely removing the locking tab 74 from the current aperture 40 and then repositioning the second arm 64 so that the locking tab 74 is in a different one of the apertures 40 as desired. More particularly, the locking tab 74 is moved into position by pivoting the first end 72 of the second arm 64 along the arcuate path defined by the apertures 40 formed within the arcuate strip 34.

Figure 5:
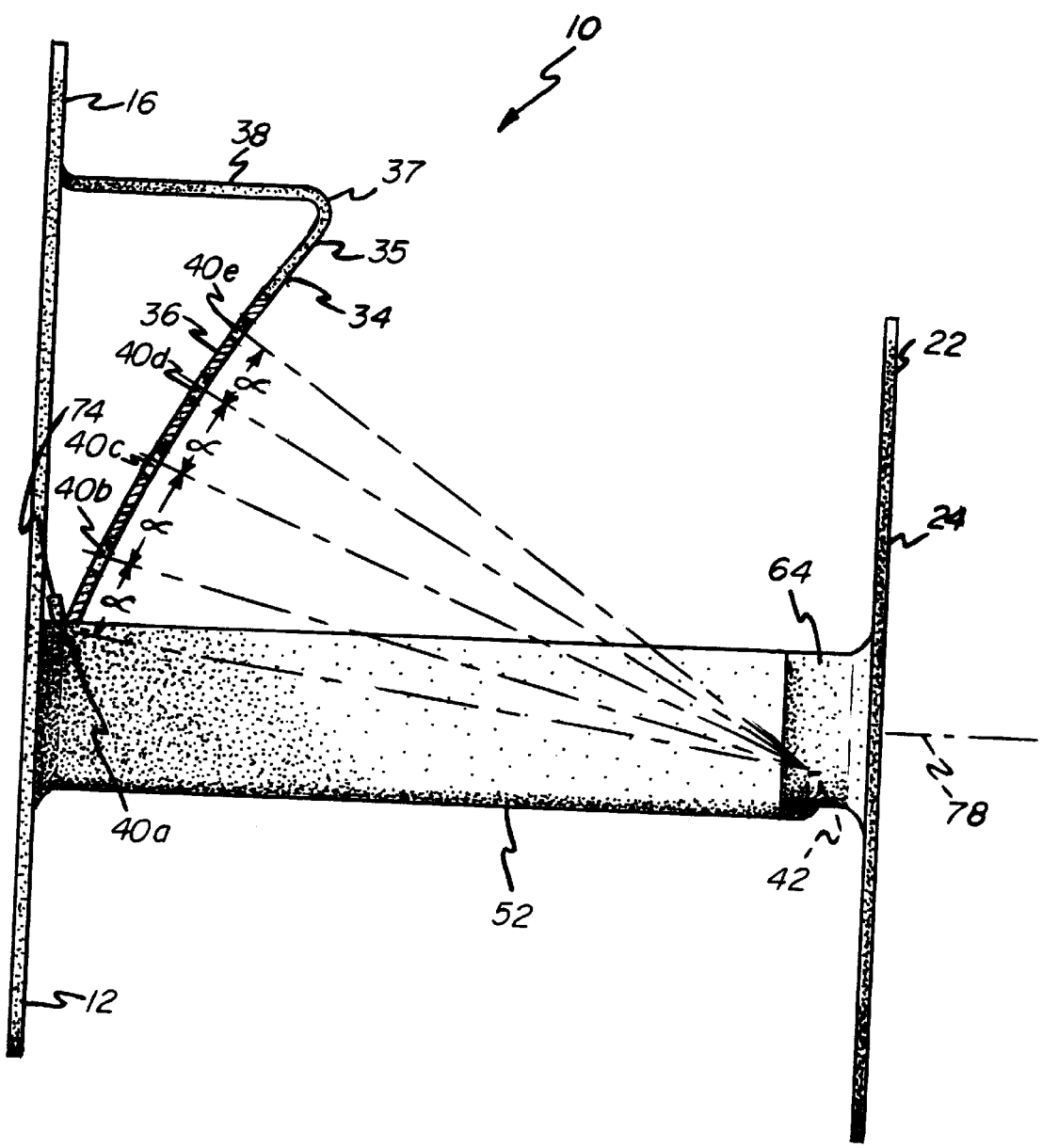
FIG. 5 is a side elevational view of the mounting bracket assembly of the present invention, illustrating the hanger in a first position.
Figure 6:
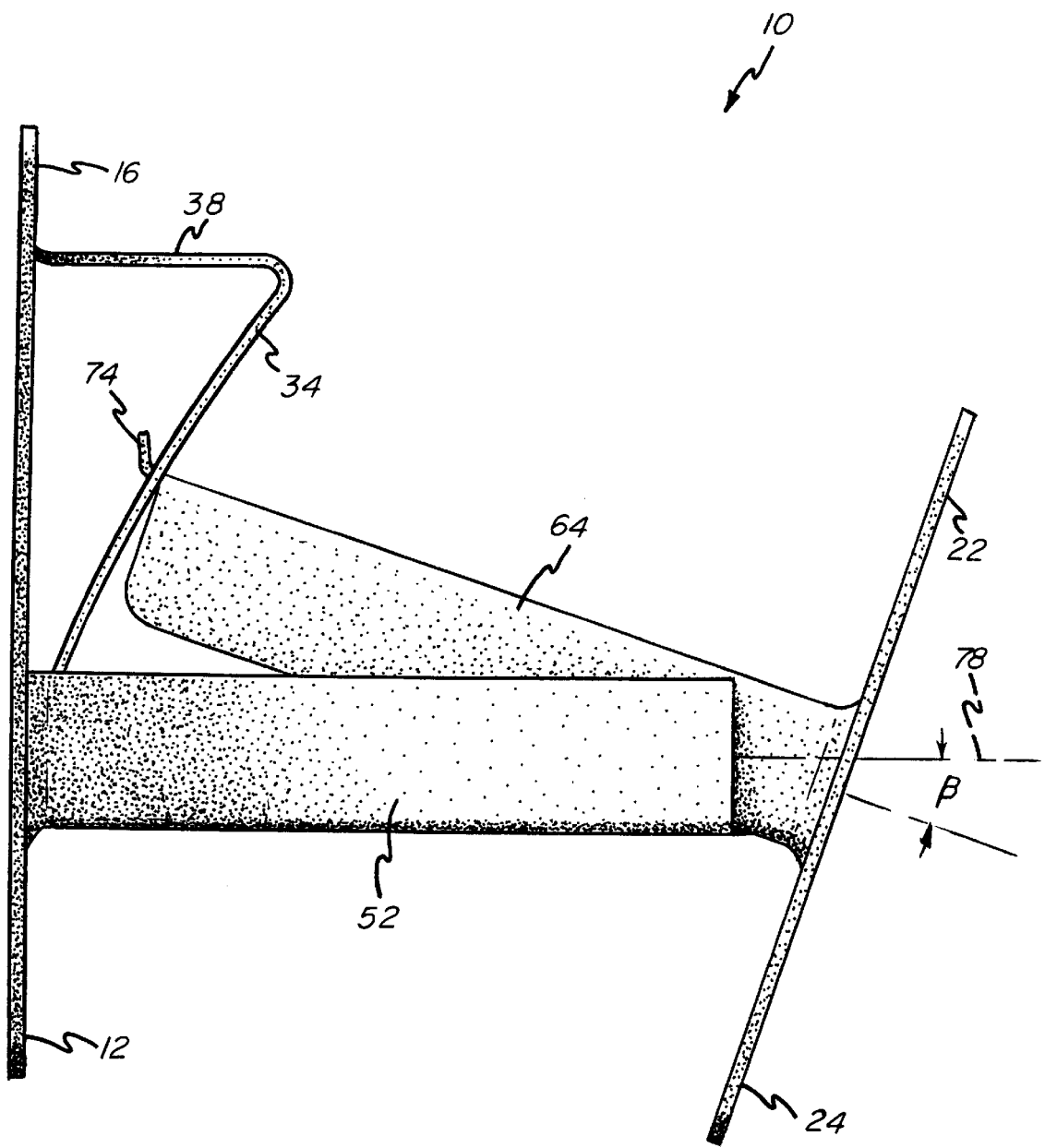
FIG. 6 is a side elevational view of the mounting bracket assembly of FIG. 5, illustrating the hanger in a second position.

With particular reference to FIGS. 5–8, the hanger 21, and thus the speaker 28, may be oriented in a variety of positions relative to a horizontal reference axis 78. For example, when the locking tab 74 is secured within the first locking aperture 40a, as illustrated in FIG. 5, the second arm 64 is positioned substantially parallel to the axis 78 while the second mounting plate 24 is positioned substantially vertical and perpendicular to the axis 78. In FIG. 6, the locking tab 74 is illustrated repositioned within the third locking aperture 40c wherein the second arm 64 is angled upwardly by an angle of approximately β degrees from horizontal. In this position, the second mounting plate 24 is angled downwardly from vertical by approximately β degrees. It should be readily appreciated that β preferably equals (2·α), or 15 degrees, wherein α equals 7½ degrees as detailed above.

Figure 7:
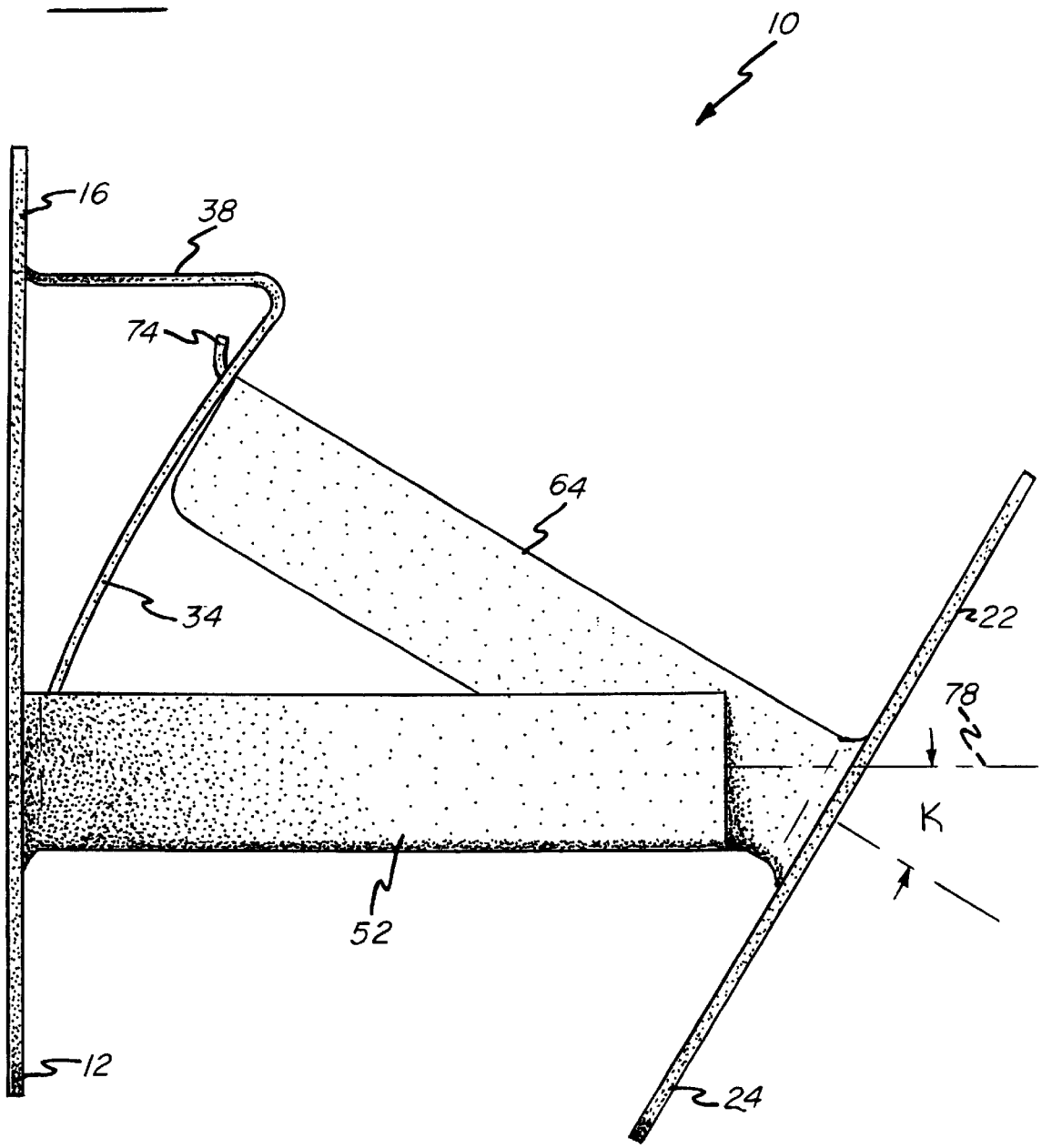
FIG. 7 is a side elevational view of the mounting bracket assembly of FIG. 5, illustrating the hanger in a third position.

Turning now to FIG. 7, the locking tab 74 is shown repositioned in the fifth locking aperture 40e wherein the second arm 64 is angled upwardly by approximately an angle of K degrees from horizontal. As such, the second mounting plate 24 is angled downwardly from vertical by approximately K degrees. K preferably equals (4·α) or 30 degrees, wherein a equals 7½ degrees as detailed above.

As may be readily appreciated, the mounting bracket assembly 10 of the present invention is formed of easily constructed components with low manufacturing costs. Further, the mounting bracket assembly 10 may be easily installed and assembled by a single individual. Likewise, the angular orientation of the object supported by the mounting bracket assembly 10 may be altered to a plurality of different positions as desired.

What is claimed is:

1. A bracket assembly for adjustably mounting an object to a support surface, said bracket assembly comprising:
   a first mounting member removably attachable to a support surface;
   a locking device supported by said first mounting member and defining a plurality of locked positions spaced apart along an arcuate path;
   a first arm including opposing first and second ends, said first end secured to said first mounting member and said second end positioned in spaced relation to said first mounting member;
   second arm including first and second ends and at least partially supported by said first arm, said first end of said second arm moveable substantially along said arcuate path for releasable engagement with said locking device at a selected one of said locked positions;
   a connector interconnecting said first arm and said second arm, said connector facilitating selected angular positioning of said second arm relative to said first mounting member; and
   wherein said locking device comprises an arcuate strip supported by said first mounting member and including a concave surface facing said second arm.

2. The bracket assembly of claim 1 further comprising a second mounting member supported by said second arm, said second mounting member releasably attachable to an object for supporting the object from a support surface.

3. The bracket assembly of claim 1 wherein said locking device further comprises:
   a locking tab supported proximate said first end of said second arm;
   a plurality of apertures formed within said arcuate strip; and
   said locking tab is selectively receivable within a selected one of said apertures for releasably locking said second arm relative to said first mounting member.

4. The bracket assembly of claim 1 wherein said connector comprises:
   a tab extending from one of said first arm and said second arm; and
   an aperture formed within the other of said first arm and said second arm for releasably receiving said tab.

5. A bracket assembly for adjustably mounting an object to a support surface, said bracket assembly comprising:
   a first mounting member removably attachable to a support surface;
   a locking device supported by said first mounting member and defining a plurality of locked positions spaced apart along an arcuate path;
   a first arm including opposing first and second ends, said first end secured to said first mounting member and said second end positioned in spaced relation to said first mounting member;
   a second arm including first and second ends and at least partially supported by said first arm, said first end of said second arm moveable substantially along said arcuate path for releasable engagement with said locking device at a selected one of said locked positions;
   a connector interconnecting said first arm and said second arm, said connector facilitating selected angular positioning of said second arm relative to said first mounting member; and
   wherein said first arm comprises a U-shaped channel including a base and a pair of side walls extending upwardly from said base, said second arm removably receivable within said side walls of said first arm.

6. The bracket assembly of claim 1 wherein said first mounting member comprises a substantially planar plate including a plurality of mounting apertures.

7. The bracket assembly of claim 2 wherein said second mounting member comprises a substantially planar plate including a plurality of mounting apertures.

8. A bracket assembly for adjustably mounting an object to a support surface, said bracket assembly comprising:
   a first mounting member removably attachable to a support surface;
   a locking device supported by said first mounting member and including a plurality of apertures spaced apart along an arcuate path;
   a pivotable arm including first and second ends and a locking tab supported proximate said first end, said first end of said pivotable arm moveable substantially along said arcuate path wherein said locking tab is selectively receivable within a selected one of said apertures for releasably locking said moveable arm relative to said first mounting member; and
   a second mounting member supported by said moveable arm and releasably attachable to an object for supporting the object from the support surface.

9. The bracket assembly of claim 8 further comprising:
   a fixed arm including opposing first and second ends, said first end secured to said first mounting member; and
   a connector operably interconnecting said moveable arm and said fixed arm, said connector facilitating selected angular positioning of said moveable arm relative to said first mounting member.

10. The bracket assembly of claim 9 wherein said connector comprises:
    a tab extending from one of said fixed arm and said moveable arm; and an aperture formed within the other of said fixed arm and said moveable arm for releasably receiving said tab.

11. The bracket assembly of claim 9 wherein said fixed arm comprises a U-shaped channel including a base and a pair of side walls extending upwardly from said base, said moveable arm removably receivable within said side walls of said fixed arm.

12. The bracket assembly of claim 8 wherein said first mounting member comprises a substantially planar plate including a plurality of mounting apertures.

13. The bracket assembly of claim 12 wherein said second mounting member comprises a substantially planar plate including a plurality of mounting apertures.

14. A bracket assembly for adjustably mounting an object to a support surface, said bracket assembly comprising:

a first mounting member removably attachable to a support surface;

a locking device supported by said first mounting member, said locking device including an arcuate strip, and a plurality of apertures formed within said arcuate strip and spaced apart along an arcuate path;

a first arm including opposing first and second ends, said first end secured to said first mounting member and said second end positioned in spaced relation to said first mounting member;

a second arm including first and second ends and a locking tab supported proximate said first end, said first end of said second arm moveable substantially along said arcuate path wherein said locking tab is selectively receivable within a selected one of said apertures for releasably locking said second arm relative to said first mounting member;

a connector including a tab extending from said first arm, and an aperture formed within said second arm for releasably receiving said tab, said connector facilitating angular positioning of said second arm relative to said first mounting member; and a second mounting member supported by said second arm, said second mounting member releasably attachable to an object for supporting the object from a support surface.

* * * * *